2 Sheets—Sheet 1.

H. GARRETT.
GRAIN-DRILL.

No. 175,065.      Patented March 21, 1876.

ATTEST.
Charles Pickles
Robert Burns

INVENTOR.
Henry Garrett
By Knight Bro.
Atty.

2 Sheets—Sheet 2.

H. GARRETT.
GRAIN-DRILL.

No. 175,065. Patented March 21, 1876.

ATTEST:
Charles Pickles
Robt Burns

INVENTOR:
Henry Garrett
By Knight Bro.
Attys.

UNITED STATES PATENT OFFICE

HENRY GARRETT, OF RICHMOND, MISSOURI.

IMPROVEMENT IN GRAIN-DRILLS.

Specification forming part of Letters Patent No. 175,065, dated March 21, 1876; application filed July 23, 1875.

*To all whom it may concern:*

Be it known that I, HENRY GARRETT, of Richmond, Ray county, State of Missouri, have invented a certain new and useful Improvement in Grain-Drills, of which the following is a specification:

The first part consists in an inclined board carrying the seed-spouts, which is provided with oval guide-plates surrounding the apertures leading to said spouts, as and for the purpose set forth. The second part consists in the rearwardly-extending inturned ends of the cutters. The third part consists in constructing the seed-hopper with a pivotal connection at one end to enable the spur-gearing at the other end to be engaged or disengaged, as set forth.

Figure 1:
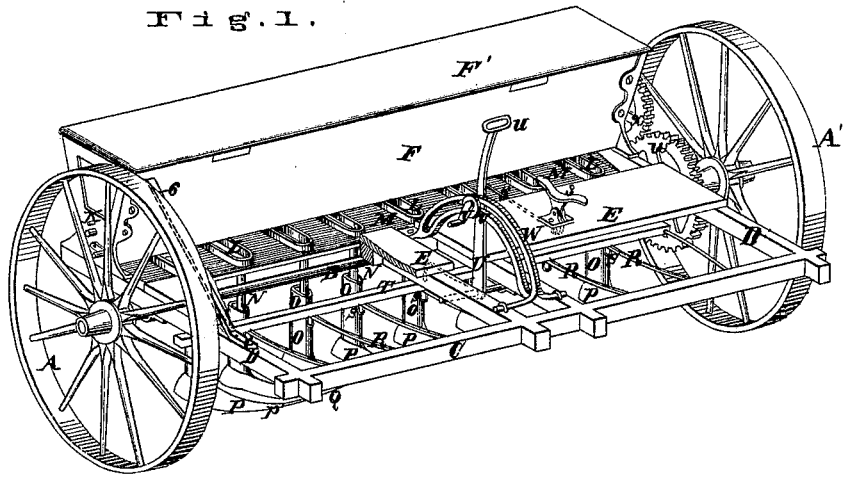
Figure 2:
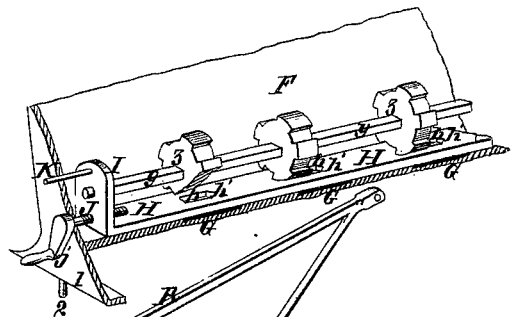
Figure 3:
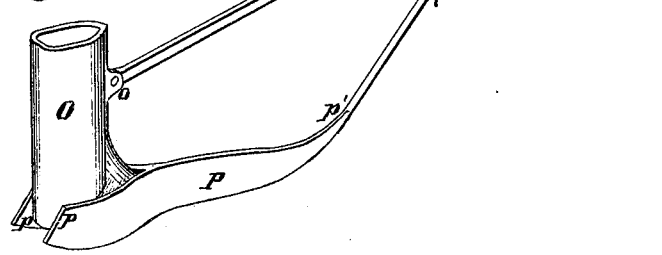
Figure 4:
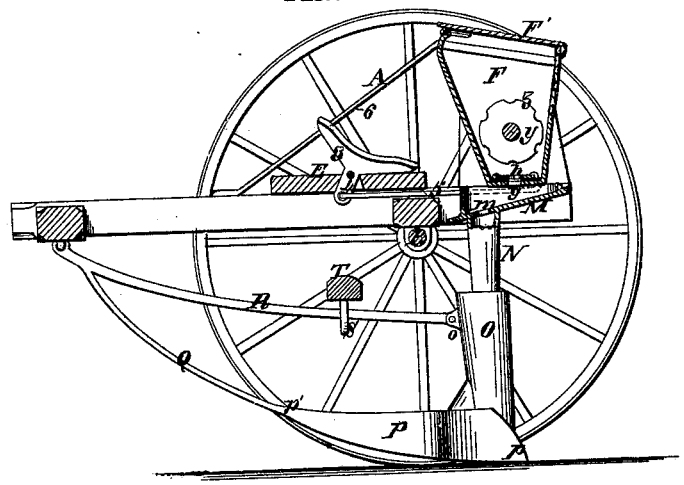
Figure 5:
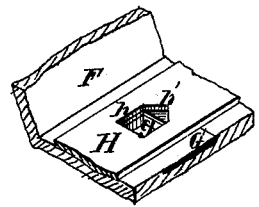

Figure 1 is a perspective view, showing the front and one end of the machine. Fig. 2 is a detail section of part of the grain-box. Fig. 3 is a rear perspective view of one of the drill-openers. Fig. 4 is a section transverse to the feed-box. Fig. 5 is a diagram, showing the top view of a seed-hole.

A A' are the ground-wheels. One, A', of these may be fast and the other, A, loose on the axle. The axle B turns in bearings beneath the frame. The frame has longitudinal bars C and transverse bars D. To the frame C D is attached the tongue, (not shown.) E is the foot-board attached to the top of the frame. F is the hopper or grain-box, having a cover, F', which forms the seat of the driver. The bottom of the box has a number of metallic plates, G, say, eight inches apart from center to center, and these plates are perforated with holes $g$ for the passage of grain from the hopper. Over these plates is a bar or plate, H, extending the whole length of the bottom, and having over each hole $g$ a seed-hole, $h$, made wedge-shaped at one end, as shown in Figs. 2 and 5, where one of the feed-rollers has a part broken out at one side to show the form of the hole $h$ beneath. This bar H has an ear, I, at one end, in which screws an adjusting-rod, J, turning in bearings in the end of the hopper. The screw-rod is turned by a handle, $j$, and acts to move the valve-bar endwise, to regulate the size of the seed-holes $g$ to suit the grain or seed being drilled, and to regulate the amount to a given area. The purpose of making the ends of the holes $h$ wedge-shaped is to allow the seed-hole $g$ to be almost closed, by sliding the bar H in such a position that only the extreme corner $h'$ is unclosed by the plate G. K is a bar extending from the ear I through the end of the hopper, and serving to indicate the position of the bar H, and thus the size of the seed-holes. From the holes $g\ h$ the seed drops into shallow cups L, extending fore and aft on a board, M, inclined downward toward the front, and having at their front ends seed-holes $m$, for the passage of seed to the flexible spouts N, whose upper ends are attached to the board M, and which conducts the grain into the boots O. The boots extend down into the ground when the drill is in operation, a furrow being opened for them by the cutter or share P. The rear end of this share has inturned corners $p$, which allow the earth to fall in from both sides of the furrow upon the grain. The cutter or share is in the form of an acute wedge, and is open in the middle, its wings extending backward each side of the boot, and ending in inturned corners $p$, which allow the earth from both sides of the furrow to fall upon the grain. The front end $p'$ of the share is welded to a draw-rod, Q, which extends upwardly and forwardly, and whose front end is welded to the bar R, whose front end has hinge connection to the front bar C of the frame, and whose rear end is hinged to the boot by ears $o$. The bar R passes through staples S in a bar, T, extending the whole width of the machine, and arranged for vertical movement to raise or lower the cutters and boots, and this bar has vertical movement for this purpose by connection to a bell-crank lever, U, whose upper end extends above the frame, and its handle $u$ has a position convenient for the hand of the operator. V is a clamping-screw screwing into the lever U and passing through a slot in a curved guide-bar, W, so as to clamp the lever fast to the guide-bar in any position in which it may be placed, a collar, $v$, of the clamping-screw pressing against one side of the guide and the lever U against the other side of the guide. By means of this lever the shares or cutters may be set shallower or deeper in the ground when drilling, or the cutters may be raised clear of the ground when moving the machine from field to field. Upon the axle is a spur-wheel, $w$, which engages a spur-wheel, $x$, upon the shaft $y$ of the fluted feed-rolls $z$. These rolls are made of india rubber at the face, and the face is fluted (as shown) so as to cause the rollers to agitate the grain and cause it to pass steadily through the feed-holes. The shaft $y$ has bearings in the ends of the seed-boxes. A feed-roll, $z$, is placed above each seed-hole $h\ g$, to cause the grain to pass regularly to and through the seed-holes. The ends of the feed-box are secured in metallic shoes 1, and the one at the right-hand end of the box has a pivot-pin, 2, which engages in a socket of the frame so as to hold that end of the box in place when the other end is moved so as to disengage or engage the gearing $w\ z$, so as to cause the feed-rolls to rotate or remain at rest, according to whether the drill is in operation, or moving from place to place. This (left) end of the box is moved fore and aft on the frame by a rocking-treadle, 3, whose lower arm 4 is connected by a rod, 5, to the box. 6 is a brace-bar, extending from the top of the box to the frame. The open boxes, or elongated receiving-cups L, allow the operator to see whether the seed is falling regularly through each seed-hole, and also act as regulators, as the discharge from their lower ends will be regular, even where it falls from the seed-holes $g\ h$ in irregular jets. The drills may be made with more or less cutters to suit them to one horse, two horses, or four horses.

I claim as my invention—

1. The inclined board M, carrying spout N, and provided with oval guide-plates L surrounding the apertures leading to said spouts, as and for the purpose set forth.

2. The openers or cutters P, having inturned rear wings $p$, to cause the earth from the sides of the furrow to fall regularly into the furrow upon the seed.

3. The combination of spur-wheels $x$ and $w$, and box F, made movable at one end to disengage the spur-wheels, for the purpose set forth.

4. The combination of spur-wheels $x$ and $w$, movable seed-box F, connecting-rod 5, and treadle 3, substantially as set forth.

HENRY GARRETT.

Witnesses:
JAMES W. BLACK,
JOSEPH BLACK.